US008422061B2

(12) United States Patent
Narita (10) Patent No.: US 8,422,061 B2
(45) Date of Patent: Apr. 16, 2013

(54) APPARATUS AND METHOD TO EXECUTE PRINT JOBS

(75) Inventor: Hirofumi Narita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 12/700,629

(22) Filed: Feb. 4, 2010

(65) Prior Publication Data

US 2010/0214601 A1    Aug. 26, 2010

(30) Foreign Application Priority Data

Feb. 26, 2009 (JP) ................................. 2009-044729

(51) Int. Cl.
*G06F 3/12* (2006.01)
*G06K 15/00* (2006.01)

(52) U.S. Cl.
USPC ....... 358/1.15; 358/1.14; 358/1.13; 358/1.16; 358/1.17

(58) Field of Classification Search .................. None
See application file for complete search history.

(56) References Cited

U.S. PATENT DOCUMENTS 6,130,757 A * 10/2000 Yoshida et al. .............. 358/1.15
2005/0088688 A1 * 4/2005 Noda ........................... 358/1.15
2006/0092464 A1 * 5/2006 Ataka .......................... 358/1.15
2006/0197978 A1 * 9/2006 Kishimoto ................... 358/1.15
2008/0055636 A1 * 3/2008 Namikata .................... 358/1.15

FOREIGN PATENT DOCUMENTS

| JP | 2000-141832 | 5/2000 |
| JP | 2004-288032 | 10/2004 |
| JP | 2004288032 A | 10/2004 |
| JP | 2006-26992 | 2/2006 |
| JP | 2007-65898 | 3/2007 |
| JP | 2008-181517 | 8/2008 |

\* cited by examiner

*Primary Examiner* — Satwant Singh
(74) *Attorney, Agent, or Firm* — Fitzpatrick, Cella, Harper & Scinto (57) ABSTRACT

To allow the management of suspended printed jobs while being distinguished based on reasons for suspension and removing the reasons to execute the print jobs, for a plurality of print jobs suspended in the printing apparatus, the print jobs are distinguished based on reasons for suspension to specify the print jobs; information making the specified plurality of print jobs and reasons for suspension recognizable is displayed on a display apparatus; and the printing apparatus is made to execute the specified plurality of print jobs according to a print instruction from a user.

8 Claims, 9 Drawing Sheets

APPARATUS AND METHOD TO EXECUTE PRINT JOBS

BACKGROUND OF THE INVENTION

1. Field of the Invention

The present invention relates to an apparatus and a method to release a suspended print job and execute the same.

2. Description of the Related Art

Conventionally, when a mismatch occurs in a printing apparatus between printing conditions (e.g., paper type and paper size) of a print job and a state of the printing apparatus, the job is suspended in the printing apparatus, and after the reason for mismatch is removed, the suspended job is executed.

A technique is known to keep suspended jobs, from which a job is designated and a print resumption instruction is issued thereto as indicated in Japanese Patent Application Laid-Open No. 2004-288032.

However, conventionally there is a need to designate the suspended jobs one by one for print resumption, thus making an operation therefor complicated.

SUMMARY OF THE INVENTION

One aspect of the present invention is to provide print control apparatus/method to cope with the above-stated problem.

Another aspect of the present invention is to provide print control apparatus/method capable of managing suspended print jobs while distinguishing them by reasons for suspension and removing the reasons to execute the print jobs.

The above-described aspects and further aspects of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. The configuration described in the following embodiments is just one example, and the present invention is not limited to the illustrated configuration.

Figure 1:
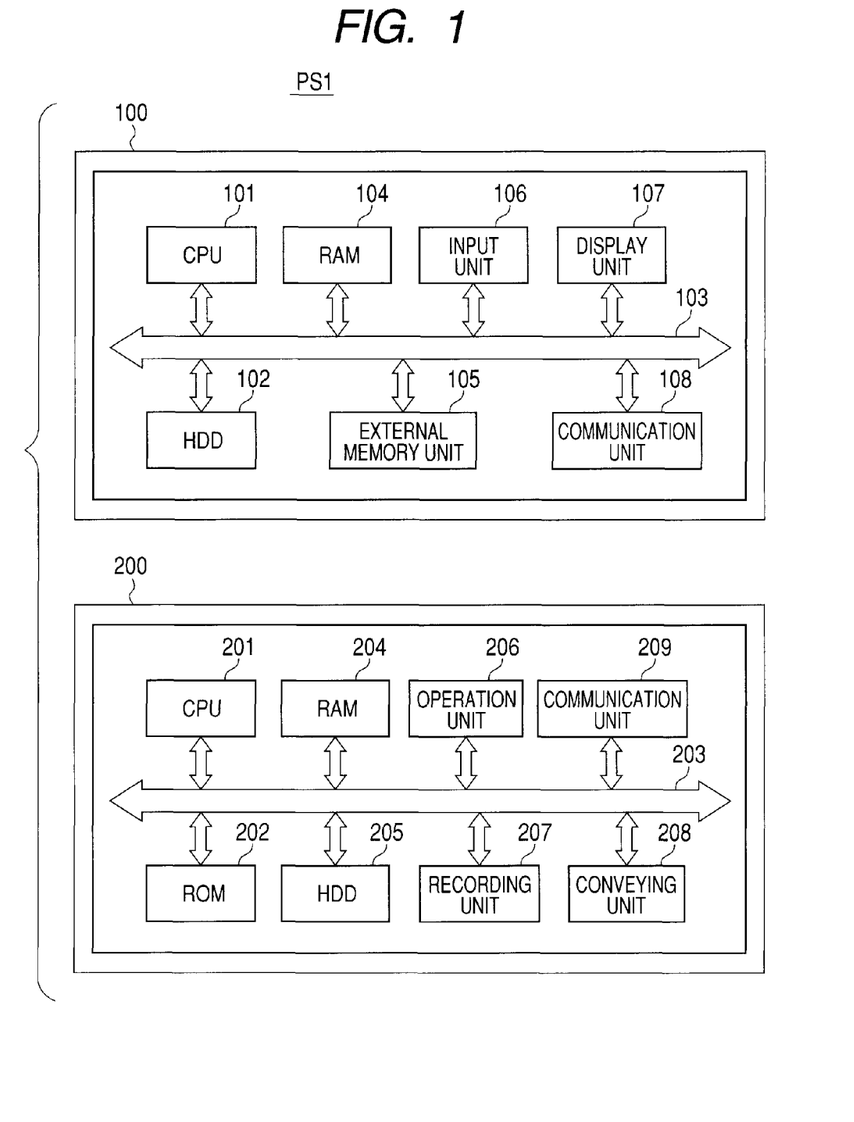
FIG. 1 is a block diagram illustrating the configuration of a print system that is an embodiment of the present invention.

FIG. 1 is a block diagram illustrating the configuration of a print system PS1 that is one embodiment of the present invention. The print system PS1 includes a host apparatus 100 and a printing apparatus 200.

The host apparatus 100 includes a CPU 101, a HDD 102, a system bus 103, a RAM 104, an external memory 105, an input unit 106, a display unit 107, and a communication unit 108. As the host apparatus 100, a general-purpose personal computer is available.

The CPU 101 controls devices connected with the system bus 103 in accordance with control programs stored in a storage device such as the HDD 102, and controls processing of OS, applications, a printer driver, a print monitor or the like. The HDD 102, that is, a hard disk drive includes a built-in hard disk with an operating system (OS) and a printer driver installed therein. The printer driver is software to control the printing apparatus 200. The HDD 102 also includes a print monitor and an application installed therein. The print monitor conducts two-way communication with the printing apparatus 200 to manage print jobs and a status of the printing apparatus 200, and the application creates various types of documents. The RAM 104 is a memory that provides a work area for the CPU 101 mainly. On the RAM 104 are resident an OS, a device driver (including a printer driver) and the like as system programs. The external memory 105 is a recording medium such as a FD (flexible disk), a CD-ROM, or an MO. Various programs and data stored in the external memory 105 can be copied to the HDD 102.

The input unit 106 specifically is a user command input device including a mouse, a keyboard and the like, receiving a command directly from a user or an input for instruction from icons and buttons on various windows provided through a user interface. The display unit 107 is configured with a CRT display, a LCD display or the like, on which user interfaces for an OS, applications, a printer driver, a printer monitor and the others are displayed.

The communication unit 108 allows the host apparatus 100 to connect with the printing apparatus 200 via a parallel interface of IEEE 1284, a serial interface such as IEEE 1394 or USB, or a network such as LAN. The host apparatus 100 transmits/receives data to/from the printing apparatus 200 via the communication unit 108.

The printing apparatus 200 includes a CPU 201, a ROM 202, a system bus 203, a RAM 204, a HDD 205, an operation unit 206, a recording unit 207, a conveying unit 208, and a communication unit 209.

The CPU 201 executes a control program stored in the ROM 202 to control an access to devices connected with the system bus 203. The RAM 204 provides a work area for the CPU 201 mainly. The ROM 202 stores a control program to be executed by the CPU 201, an image processing table for printing and the like. The HDD 205 provides many kinds of storage regions and work areas such as a temporary storage region and a permanent storage region for print jobs, and a storage region of an image processing table for each type of paper.

The operation unit 206 includes an LED, a LCD display, operation buttons and the like, receiving an input from a user and displaying information.

The conveying unit 208 controls conveying of printing paper to print an image thereon. The recording unit 207 executes image printing on printing paper by any recording method such as electrophotography or ink-jet. The communication unit 209 allows the printing apparatus 200 to connect with the host apparatus 100 via a parallel interface of IEEE 1284, a serial interface such as IEEE 1394 or USB, or a network such as LAN. The printing apparatus 200 transmits/receives data to/from the host apparatus 100 via the communication unit 209.

Figure 2:
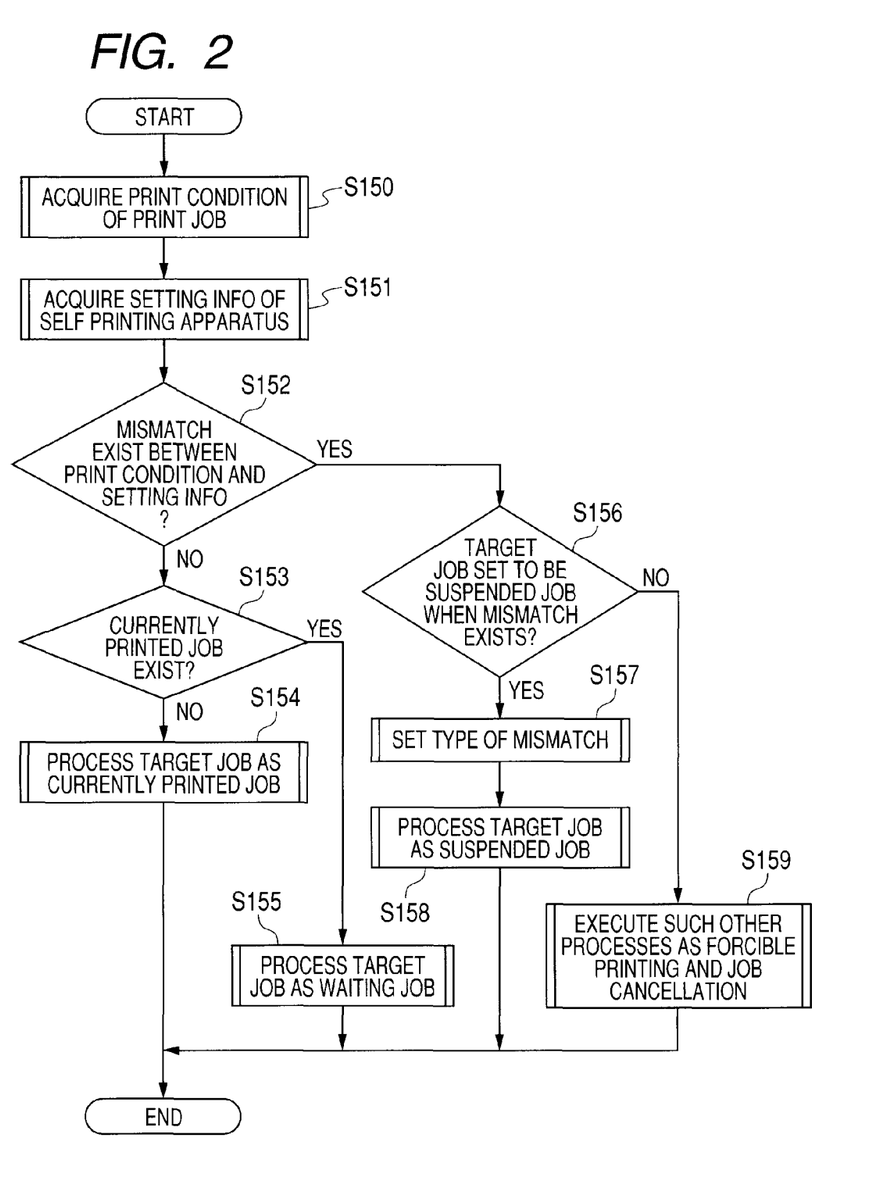
FIG. 2 is flowcharts illustrating a process flow to create a job list.

FIG. 2 is a flowchart illustrating a process flow to create a job list in the printing apparatus 200. This flowchart illustrates a process flow conducted by loading of the control program stored in the ROM 202 to the RAM 204 and execution of the program by means of the CPU 201.

At S150, the printing apparatus 200 acquires printing conditions such as a paper type, a paper size and printing orientation included in a print job (target job) received from the host apparatus 100. Subsequently, at S151, the printing apparatus 200 acquires setting information (a state) currently set in the printing apparatus 200 itself such as a paper type and a size (roll paper width) of printing paper.

At S152, the printing apparatus 200 compares the acquired printing conditions of the print job and the setting information of the printing apparatus 200 itself to determine whether there is a mismatch therebetween or not. If it is determined at S152 as no mismatch existing, the printing apparatus 200 determines at S153 whether a currently printed job exists or not. If it is determined at S153 as no currently printed job existing, then at S154 the printing apparatus 200 registers the target job as a currently printed job in a job list to conduct a printing process thereto. If it is determined at S153 as a currently printed job existing, then at S155 the printing apparatus 200 registers the target jog as a waiting job in the job list to conduct a print waiting process thereto.

If it is determined at S152 that a mismatch exists, the printing apparatus 200 determines at S156 whether the setting of the printing apparatus 200 itself is to make a target job a suspended job when a mismatch exists. If it is determined at S156 that the setting is to make a target job a suspended job when a mismatch exists, the printing apparatus 200 sets at S157 as job management information of the RAM 204 a mismatch type as to the mismatch resulting from a paper type, a paper size or other reasons. Subsequently, at S158 the printing apparatus 200 registers the target job as a suspended job in the job list to conduct a suspend process thereto.

If it is determined at S156 that the setting is not to make a target job a suspended job when a mismatch exists, the printing apparatus 200 executes at S159 other processes such as forcible printing and job cancellation of the target job that is the setting of the printing apparatus 200 itself as a processing method for mismatch. The forcible printing is to execute printing using paper with the highest priority among paper types currently set in the printing apparatus 200 even when a mismatch occurs.

It is assumed that if a mismatch exists between printing conditions of a print job and setting information of the printing apparatus 200 itself, the printing apparatus 200 sets a target job as a suspended job.

Figure 3:
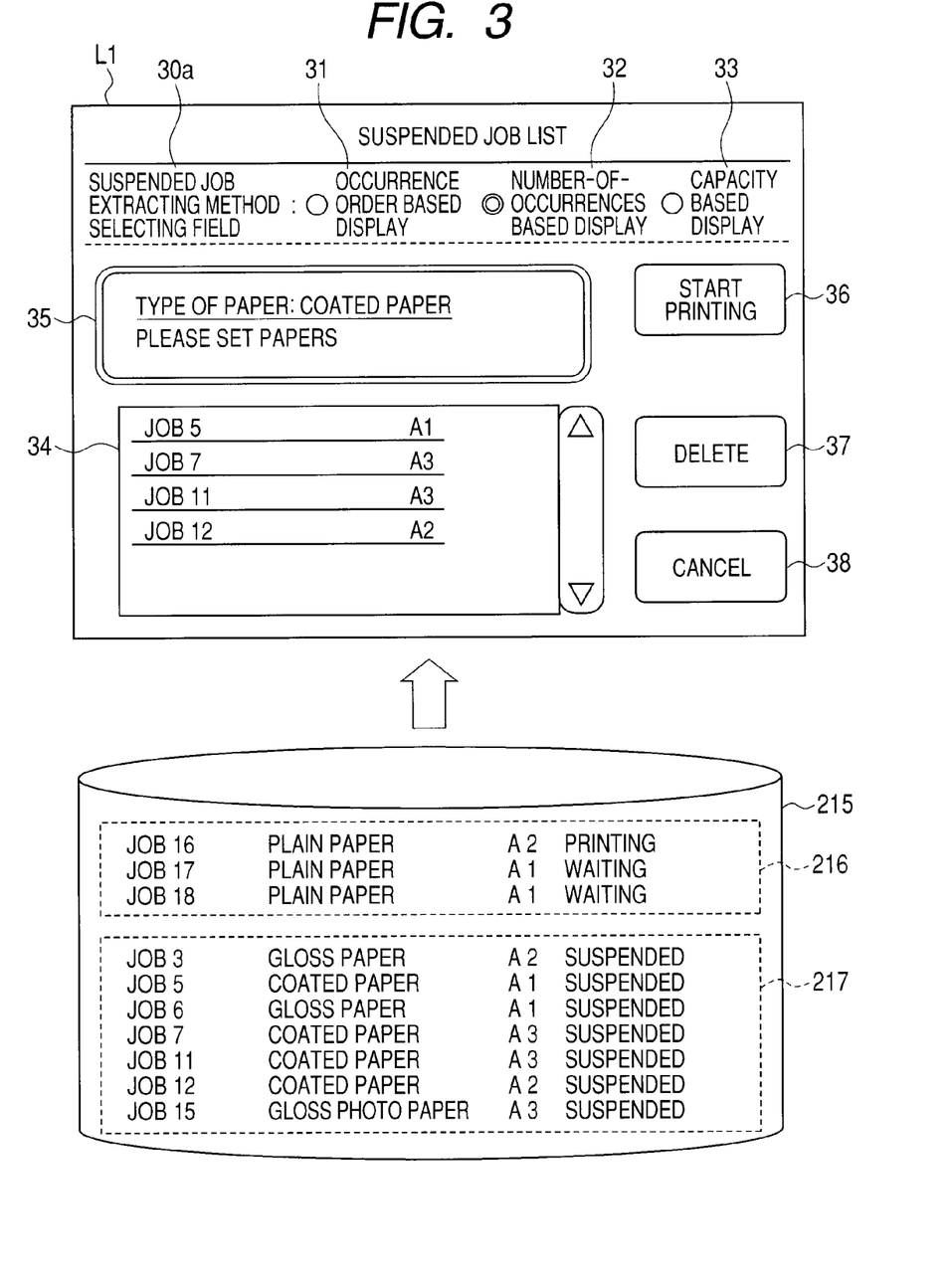
FIG. 3 illustrates a suspended job list.

FIG. 3 illustrates a suspended job list L1 displayed on the operation unit 206, showing an exemplary case of a mismatch occurring about a paper type of a print job.

The suspended job list L1 includes a suspended job extracting method selection field 30a, a list display part 34, a mismatch canceling guidance field 35, a print start instruction button 36, a delete instruction button 37, and a cancel instruction button 38.

The selection field 30a instructs to sort suspended jobs based on conditions on mismatch reasons for display. The conditions includes occurrence order based display 31, number-of-occurrences based display 32, and capacity based display 33. When the occurrence order based display 31 is designated, a job group suspended due to the same reason as the job with the earliest occurring mismatch reason is extracted from the suspended job group and displayed (conversely, the newest job also may be extracted). When the number-of-occurrences based display 32 is designated, suspended jobs are extracted and displayed in the decreasing order of the number-of-occurrences of mismatch reasons. When the capacity based display 33 is designated, suspended jobs are executed and displayed in the decreasing order of capacity (the total data amount of job groups) (conversely, jobs with smaller data amount may be extracted).

The guidance field 35 displays guidance on an operation to be conducted by a user to release a suspended state. FIG. 3 displays guidance urging to set coated paper in the printing apparatus 200.

FIG. 3 further illustrates the state of the number-of-occurrences based display 32 being selected in the selection field 30a. When the number-of-occurrences based display 32 is designated, the printing apparatus 200 counts the number of mismatch reasons for suspended jobs in a suspended job group 217 kept in a temporary storage region 215 in the HDD 205, based on types, and extracts suspended jobs in the decreasing order of the number of the counted jobs and lists up the same in the order. Then, this list is displayed on the list display part 34. In the suspended job group 217, the most frequent reason for suspension of print jobs is that coated paper is not set in the printing apparatus 200, and therefore the list display part 34 displays jobs suspended for coated paper as the list. A paper width is not considered herein.

The button 36 is pressed to execute printing of a suspended job group displayed on the list display part 34. If there is a currently printed job or a job whose printing process has been started, the button 36 may be set in a disabled state. This is because if there is a currently printed job or a job whose printing process has been started, the exchange of paper according to the guidance field 35 may cause the printed job or the job whose printing process has been started to become a suspended job.

Then, when a user presses the button 36, if the mismatch reason has been removed, the printing apparatus 200 starts to print the suspended jobs listed up in the list display part 34. At this time, the printing apparatus 200 does not execute the printing of suspended jobs that are suspended for other mismatch reasons.

The button 37 is pressed to delete a suspended job group displayed on the list display part 34. This button is pressed when there is no need to print and no need to keep the suspended state. When the button 37 is pressed, the printing apparatus 200 deletes the suspended job group listed up in the list display part 34 from the HDD 205.

The button 38 is pressed to cancel a mismatch canceling process while keeping a suspended state. When the button 38 is pressed, the display of the operation unit 206 returns to a default screen.

If the occurrence order based display 31 is selected in the selection field 30a, suspended jobs are picked up based on gloss paper that is a setting value of a job 3 for which a mismatch occurs first and which is suspended. As a result, jobs 3 and 6 will be displayed on the list display part 34, whose mismatch reasons can be cancelled by replacing with gloss paper.

If the capacity based display 33 is selected in the selection field 30a, a total data capacity of suspended jobs is determined for each mismatch reason, and a job group with the largest total data capacity is displayed on the list display part 34.

Figure 4:
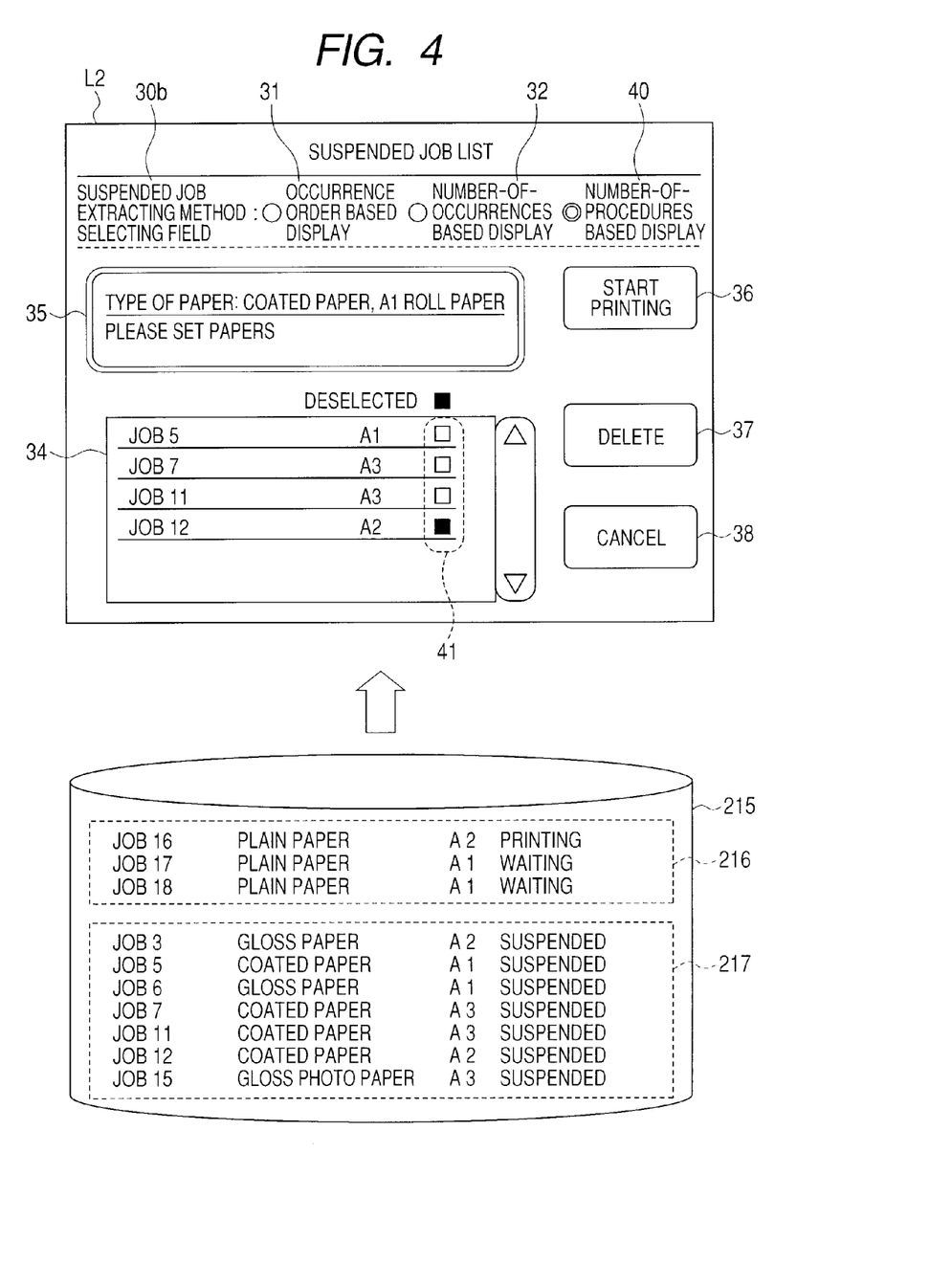
FIG. 4 illustrates a suspended job list.

FIG. 4 illustrates another exemplary suspended job list.

A suspended job list L2 is provided with number-of-procedures based (increasing order) display 40 instead of the capacity based display 33 of the suspended job list L1. In the state of FIG. 4, the number-of-procedures based display 40 is selected. The number-of-procedures refers to the number of procedures to be conducted by a user to cancel a mismatch reason. Although FIG. 4 illustrates the number-of-procedures based display 40 instead of the capacity based display 33, the number-of-procedures based display 40 may be added to the display of FIG. 3, or items in the selection field 30a may be selected appropriately.

When the number-of-procedures based display 40 is selected, the printing apparatus 200 searches mismatch reasons for a suspended job group in view of the number-of-procedures by the user, too. Assume that the printing apparatus 200 has a setting to execute printing even when paper set in the printing apparatus 200 and paper designated by a print job are different in paper width. In this case, the printing apparatus 200 executes printing according to a print job of A3-width or A2-width on paper of A1-width, and makes a user cut off a blank space on the paper. If a user sets A3-size coated roll paper in the printing apparatus 200 for the suspended jobs in the list display part 34 of FIG. 4, their mismatch reasons can be cancelled only for two jobs of a job 7 and a job 11, and a job 5 and a job 12 still remain as suspended jobs. Subsequently, when A2-size coated roll paper is set in the printing apparatus 200, their mismatch reason can be cancelled for the job 12, but the job 5 still remains as a suspended job. In order to cancel the mismatch reason for the job 5, there is a need to further set A1-size coated roll paper in the printing apparatus 200. That is, three procedures might be required at maximum. Meanwhile, the guidance field 35 of FIG. 4 guides an operation requiring only one operation with consideration given to the jobs listed up in the list display part 34 not only for paper types but also for paper width so as to make the number-of-procedures minimum.

The example illustrated in FIG. 4 is further provided with a suspension release deselect field 41, designating the job 12 in this example.

That is, without the deselect function, and when a user sets A1-size coated roll paper in the printing apparatus 200, mismatch reasons will be cancelled for all jobs suspended for coated paper picked up on the list display part 34 including the job 5, the job 7, the job 11 and the job 12. However, when designation is made so that suspension release is deselected for the job 12, printing of the job 12 is not executed even when A1-size coated roll paper is set. This is for avoiding the printing if a user does not want the printing causing a blank space.

Figure 5:
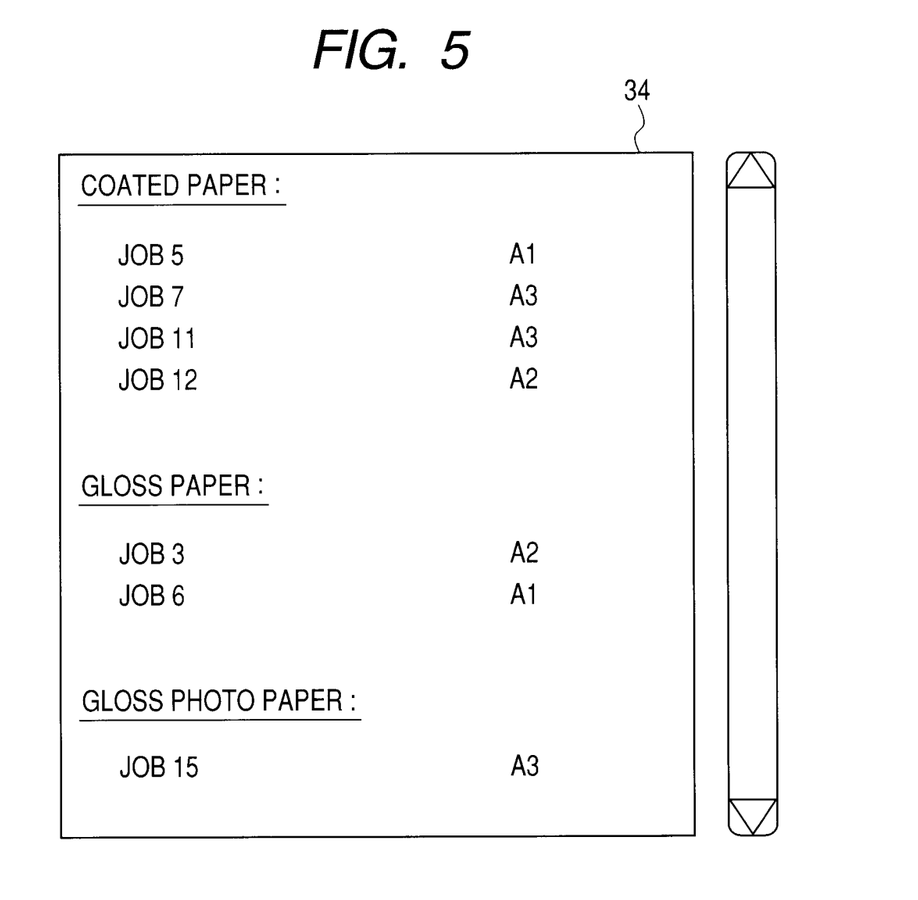
FIG. 5 illustrates a suspended job list.

FIG. 5 illustrates another display example in the list display part 34.

Assume that the number-of-occurrences based display 32 is selected in the selection field 30a of FIG. 3 or FIG. 4. Since the number of mismatch jobs suspended for coated paper, gloss paper and gloss photo paper are 4, 2, and 1, respectively, they are listed in the order of coated paper, gloss paper and gloss photo paper.

According to the list display part 34 as in FIG. 5, all suspended jobs are listed up based on their mismatch reasons (indicated by character strings such as "coated paper", "gloss paper" and "gloss photo paper"), a plurality of mismatch reasons for suspension can be confirmed at one time.

The following flowcharts of FIGS. 6 to 9 illustrate a process flow conducted by the CPU 201 to load the control program stored in the ROM 202 to the RAM 204 and execute the program.

Figure 6:
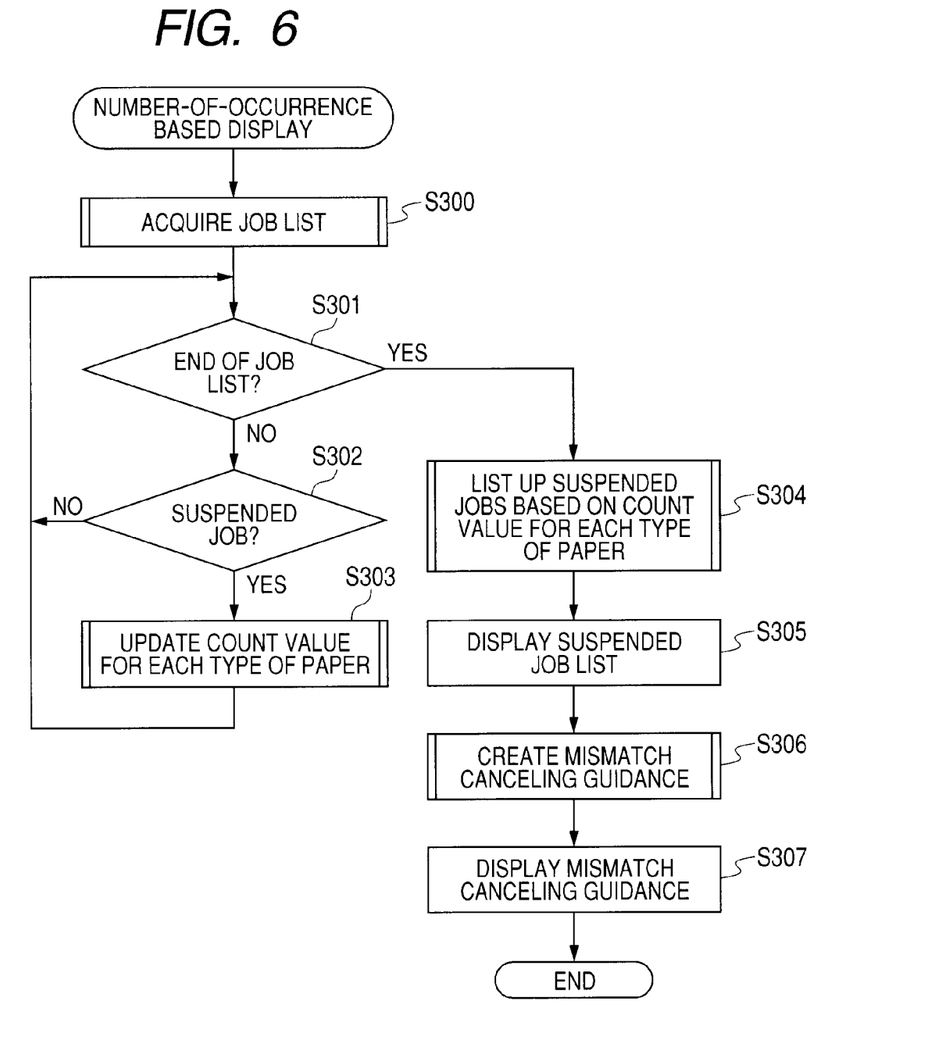
FIG. 6 is flowcharts illustrating a process flow to create a job list.

FIG. 6 is a flowchart illustrating a process flow in the case where the number-of-occurrences based display 32 is selected in the selection field 30a.

At S300, the printing apparatus 200 acquires a job list existing in the temporary storage region 215 provided in the HDD 205 of the printing apparatus 200, and the printing apparatus 200 determines at S302 whether a process target job remains as a suspended job until it is determined as the end of the job list at S301.

If it is determined as a suspended job, the printing apparatus 200 counts a setting value of a paper type as a mismatch reason for the suspended job based on paper types at S303. If it is determined as the end of the job list at S301, the printing apparatus 200 lists up the suspended jobs based on count values of paper types at S304. Subsequently, at S305, the printing apparatus 200 displays a suspended job list on the list display part 34. At this time, the list displayed may include the entire suspended job or only suspended jobs with the largest counter value for paper types.

Subsequently, the printing apparatus 200 creates mismatch canceling guidance for the suspended jobs listed up on the list display part 34 at S306, and displays the mismatch canceling guidance at S307.

Figure 7:
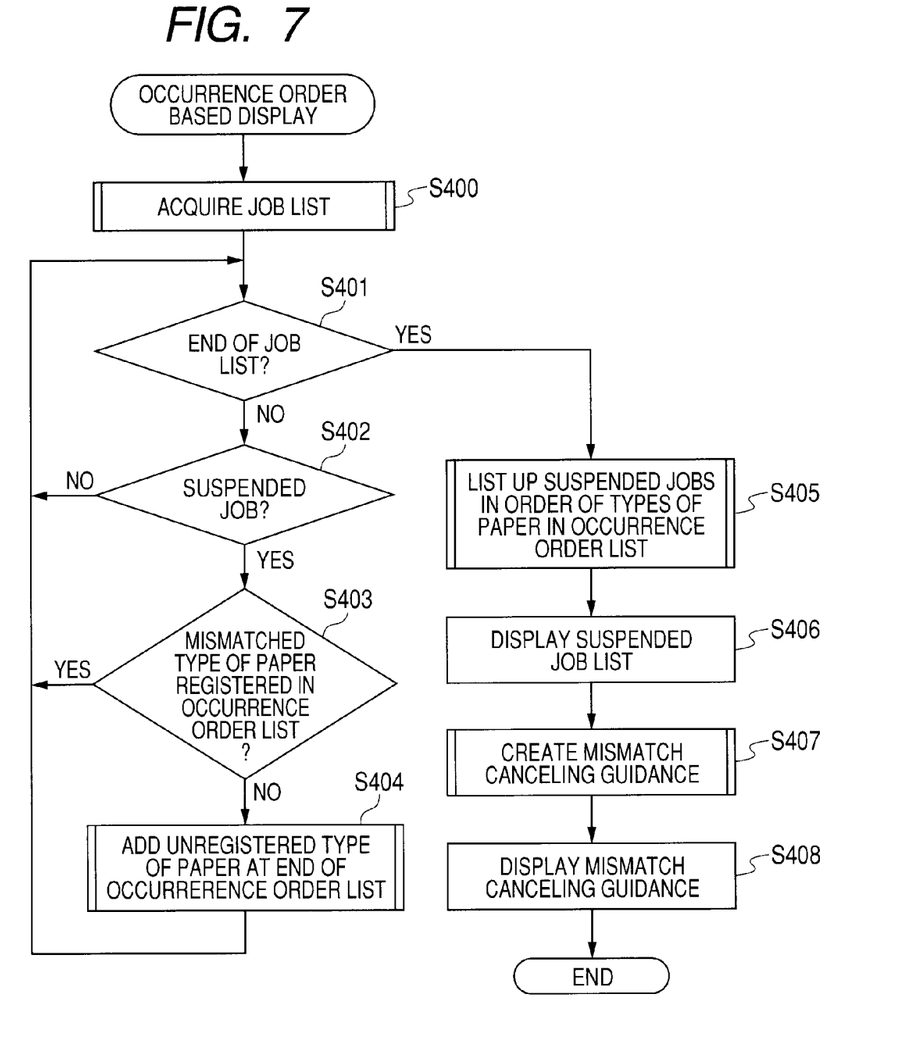
FIG. 7 is flowcharts illustrating a process flow to create a job list.

FIG. 7 is a flowchart illustrating a process flow in the case where the occurrence order based display 31 is selected in the selection field 30a.

At S400, the printing apparatus 200 acquires a job list existing in the temporary storage region 215 provided in the HDD 205 of the printing apparatus 200, and the printing apparatus 200 determines at S402 whether a process target job remains as a suspended job until it is determined as the end of the job list at S401. If it is determined as a suspended job, the printing apparatus 200 determines at S403 whether a paper type as a mismatch reason for the suspended job is included in paper types already registered in an occurrence order list.

If it is determined at S403 that the mismatched paper type is not registered in the occurrence order list, the printing apparatus 200 registers the unregistered paper type at the end of the occurrence order list at S404. If it is determined at S401 as the end of the job list, the printing apparatus 200 lists up the suspended jobs in the order of the paper types in the occurrence order list at S405. Subsequently, the printing apparatus 200 displays a suspended job list on the list display part 34 at S406. At this time, the list displayed may include the entire suspended job or only suspended jobs of the paper type occurring first. Subsequently, the printing apparatus 200 creates mismatch canceling guidance for the suspended jobs listed up on the list display part 34 at S407, and displays the mismatch canceling guidance at S408.

Figure 8:
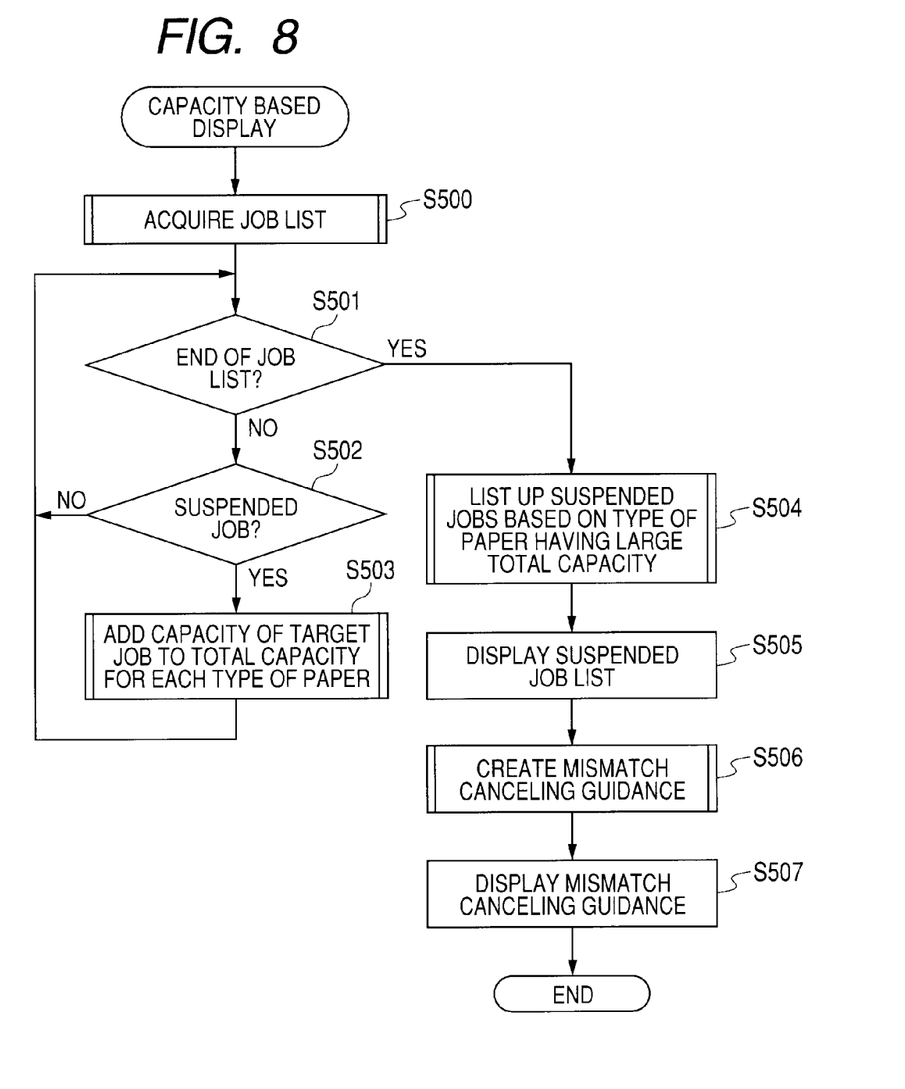
FIG. 8 is flowcharts illustrating a process flow to create a job list.

FIG. 8 is a flowchart illustrating a process flow in the case where the capacity based display 33 is selected in the selection field 30a.

At S500, the printing apparatus 200 acquires a job list existing in the temporary storage region 215 provided in the HDD 205 of the printing apparatus 200, and the printing apparatus 200 determines at S502 whether a process target job remains as a suspended job until it is determined as the end of the job list at S501. If it is determined as a suspended job, the printing apparatus 200 adds a capacity of the target job to the total capacity for each type of paper provided for each setting value of a paper type as mismatch reasons for the suspended jobs at S503.

If it is determined at S501 as the end of the job list, the printing apparatus 200 lists up the suspended jobs in the decreasing order of the total capacities of paper types at S504. Subsequently, the printing apparatus 200 displays a suspended job list on the list display part 34 at S505. At this time, the list displayed may include the entire suspended job or only suspended jobs of the paper type with the largest total capacity. Subsequently, the printing apparatus 200 creates mismatch canceling guidance for the suspended jobs listed up on the list display part 34 at S506, and displays the mismatch canceling guidance at S507.

Figure 9:
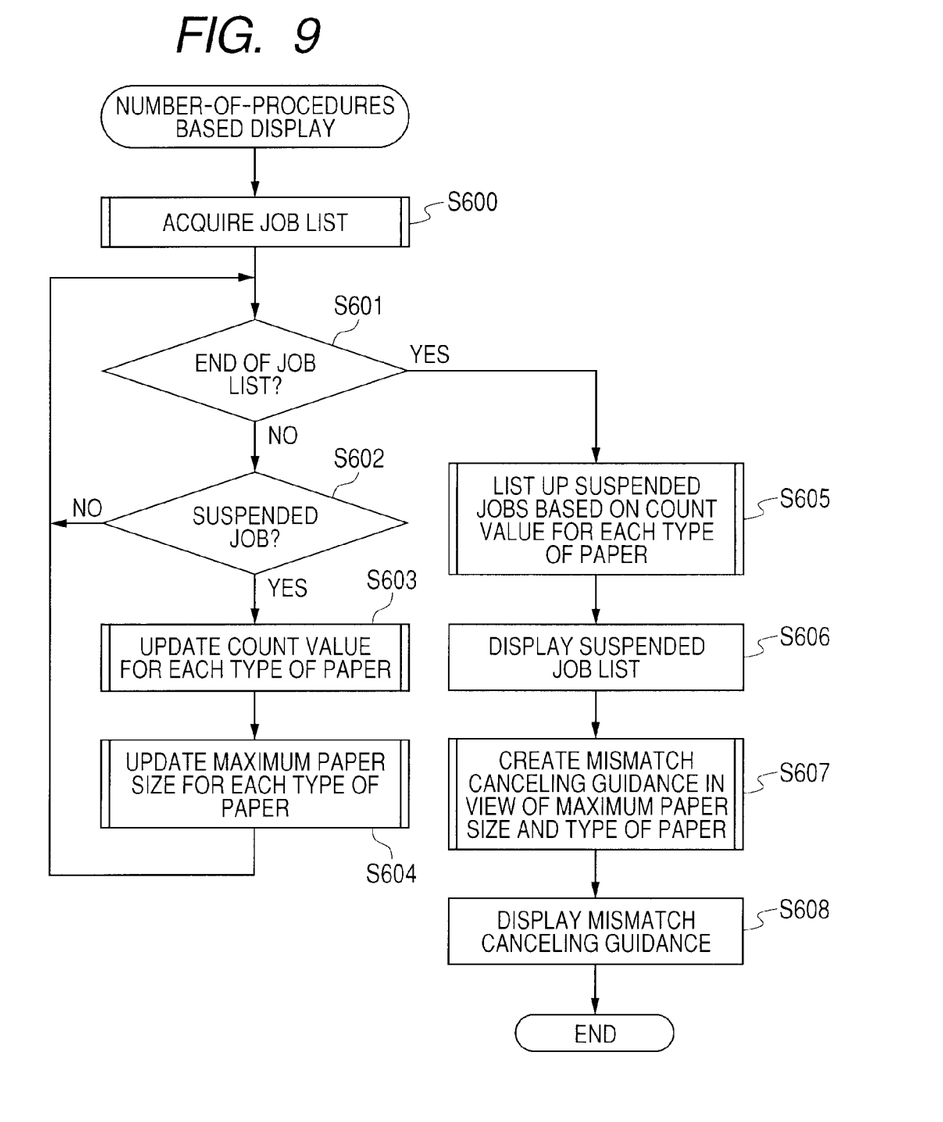
FIG. 9 is flowcharts illustrating a process flow to create a job list.

FIG. 9 is a flowchart illustrating a process flow in the case where the number-of-procedures based (increasing order) display 40 is selected in the selection field 30b.

At S600, the printing apparatus 200 acquires a job list existing in the temporary storage region 215 provided in the HDD 205 of the printing apparatus 200. The printing apparatus 200 determines at S602 whether a process target job remains as a suspended job until it is determined as the end of the job list at S601. If it is determined as a suspended job, the printing apparatus 200 counts a setting value of a paper type as a mismatch reason for the suspended job, for each paper type at S603. Subsequently, if a paper size of the process target job is larger than the maximum paper size of the paper type of the suspended job, the printing apparatus 200 updates the maximum paper size of the paper type at S604.

If it is determined as the end of the job list at S601, the printing apparatus 200 lists up suspended jobs based on the count values for each paper type at S605. Subsequently, the printing apparatus 200 displays a suspended job list on the list display part 34 at S606. At this time, the list displayed may include the entire suspended job or only suspended jobs of the paper type with the largest count value. Subsequently, the printing apparatus 200 creates mismatch canceling guidance to make the number-of-procedures minimum in view of paper types and paper sizes of the suspended jobs and paper types and the maximum paper size available in the printing apparatus 200 at S607. The printing apparatus 200 displays the mismatch canceling guidance at S608.

That is the description for an example of the printing apparatus 200 behaving as a print control apparatus that controls display and processes of a suspended job group.

In the above-stated embodiments, FIGS. 3 to 5 can be displayed on the display unit 107 by a print monitor installed in the host apparatus 100, instead of using the operation unit 206 of the printing apparatus 200. In this case, the host apparatus 100 acquires information on suspended jobs and the current state (information on paper set therein, for example) of the printing apparatus 200 stored in the HDD 205 from the printing apparatus 200, and conducts processes in a procedure similar to the case conducted by the printing apparatus 200. A print instruction is transmitted from the host apparatus 100 to the printing apparatus 200, and upon reception of the instruction, the printing apparatus 200 executes printing. This process is implemented by the CPU 101 to load the control program stored in the HDD 102 to the RAM 104 and execute the program. In the case where the host apparatus 100 controls the display and processes of a suspended job group like this, the host apparatus 100 functions as a print control apparatus.

According to the above-stated embodiments, a large number of mismatch reasons for suspended jobs can be understood at one time, and their suspended state can be released effectively. Further, according to the above-stated embodiments, a suspended job can be specified according to a user's desired condition among a plurality of sorting methods (specifying methods) based on types of mismatch reasons, and the suspended state thereof can be released. Further, according to the above-stated embodiments, an unintended release of a specific suspended job is avoided while releasing suspended states of other suspended jobs. Alternatively, a suspended state of a specific suspended job can be released.

The above-description deals with the case where a mismatch occurs because paper designated by a print job is not currently set in the printing apparatus 200. However, a mismatch reason is not limited to this, and other conditions also can be used. For instance, in the case where the printing apparatus 200 has a staple function and a print job designates an instruction to staple paper, a mismatch reason may be the shortage of staples of the staple function in the printing apparatus 200.

A print job may be issued from an apparatus other than the host apparatus 100. In the case where the printing apparatus 200 has a copy function, a print job (copy job) may be to print an image read by a scanner of the printing apparatus 200 itself.

The present invention can be implemented also by executing the following processes. That is, software (a program) implementing functions of the above-stated embodiments may be supplied to a system or an apparatus via a network or various storage media, and the system or a computer of the apparatus (or a CPU or a MPU) may read the program for execution. The program may be executed by one computer or executed by a plurality of computers operating together. There is no need to implement all of the above-stated processes with software, and a part or all of them can be implemented using hardware.

The present invention is not limited to the above-stated embodiments, and various modifications (including a combination of a plurality of embodiments) can be made based on the gist of the present invention, which is not excluded from the scope of the present invention.

That is the description of various examples and embodiments of the present invention. However, the gist and the scope of the present invention are not limited to a specific description in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-044729, filed Feb. 26, 2009, which is hereby incorporated by reference herein in its entirety.

What is claimed is:

1. A print control apparatus that controls a printing apparatus capable of, when a received print job cannot be executed, suspending the print job, comprising:
    a specification unit that, for a plurality of print jobs suspended in the printing apparatus, specifies the print jobs based on reasons for suspension;
    a display control unit that displays information making the plurality of print jobs specified by the specification unit and reasons for suspension recognizable on a display apparatus; and
    a print control unit that causes the printing apparatus to execute the plurality of print jobs specified by the specification unit according to a print instruction from a user,
    wherein the specification unit specifies, among the plurality of print jobs suspended in the printing apparatus, jobs with a largest value, of jobs suspended because of a same reason.

2. The print control apparatus according to claim 1, wherein the specification unit specifies a print job suspended because paper designated by the print job is not set in the printing apparatus.

3. The print control apparatus according to claim 2, wherein the display control unit displays, as information making a reason for job suspension recognizable, information on paper to be set in the printing apparatus on the display apparatus.

4. The print control apparatus according to claim 1, wherein the specification unit specifies, among the plurality of print jobs suspended in the printing apparatus, a job received first and a job suspended because of a same reason as the job received first.

5. The print control apparatus according to claim 1, wherein the specification unit specifies, among the plurality of print jobs suspended in the printing apparatus, jobs suspended with a largest total number, of jobs because of a same reason.

6. The print control apparatus according to claim 1, wherein the specification unit specifies, among the plurality of print jobs suspended in the printing apparatus, jobs with a largest total amount of data, of jobs suspended because of a same reason.

7. A data processing method that controls a job suspended in a printing apparatus capable of, when a received print job cannot be executed, suspending the print job, comprising:

specifying, for a plurality of print jobs suspended in the printing apparatus, the print jobs based on reasons for suspension;

displaying information making the specified plurality of print jobs and reasons for suspension recognizable on a display apparatus; and causing the printing apparatus to execute the specified plurality of print jobs according to a print instruction from a user, wherein the specified print jobs are jobs with a largest value, of jobs suspended because of a same reason, among the plurality of print jobs suspended in the printing apparatus.

8. A non-transitory computer readable storage medium that stores a computer program executable by a computer to control a job suspended in a printing apparatus capable of, when a received print job cannot be executed, suspending the print job, the computer program implementing:

specifying, for a plurality of print jobs suspended in the printing apparatus, the print jobs based on reasons for suspension;

displaying information making the specified plurality of print jobs and reasons for suspension recognizable on a display apparatus; and causing the printing apparatus to execute the specified plurality of print jobs according to a print instruction from a user, wherein the specified print jobs are jobs with a largest value, of jobs suspended because of a same reason, among the plurality of print jobs suspended in the printing apparatus.

* * * * *